United States Patent [19]

Johnson, Jr. et al.

[11] Patent Number: 4,899,335

[45] Date of Patent: Feb. 6, 1990

[54] SELF ROUTING PACKET SWITCHING NETWORK ARCHITECTURE

[75] Inventors: James M. Johnson, Jr.; Ronald A. Spanke, both of Wheaton, Ill.

[73] Assignee: American Telephone and Telegraph Company, AT&T Bell Laboratories, Murray Hill, N.J.

[21] Appl. No.: 287,775

[22] Filed: Dec. 21, 1988

[51] Int. Cl.[4] .............................................. H04J 3/26
[52] U.S. Cl. ..................................................... 370/60
[58] Field of Search ........................ 370/60, 94, 56, 61

[56] References Cited

U.S. PATENT DOCUMENTS 4,516,238  5/1985  Huang et al. .......................... 370/60
4,621,359  11/1986  McMillen .............................. 370/60

OTHER PUBLICATIONS

A. Huang et al., "Starlite: A Wideband Digital Switch", *IEEE Global Telecommunications Conference*, vol. 1, Nov. 26-29, 1984, pp. 121-125.

Primary Examiner—Douglas W. Olms
Assistant Examiner—Melvin Marcolo
Attorney, Agent, or Firm—Kenneth H. Samples

[57] ABSTRACT

A network architecture of the sort-then-expand type for routing packets including destination information is disclosed. The network includes a distribution stage comprising a plurality of input sorts units, an intermediate stage comprising a plurality of intermediate sort units and an output stage comprising a plurality of output switches. The input sort units each distribute a plurality of packets to the intermediate sort units such that each intermediate sort unit receives approximately the same number of packets destined for each output switch as the other intermediate sort units. Each intermediate sort unit identifies packet groups for a common output switch and connects the groups to the destination output switch. Each destination output switch merges the received groups of packets and distributes them to output ports.

13 Claims, 4 Drawing Sheets

SELF ROUTING PACKET SWITCHING NETWORK ARCHITECTURE

FIELD OF INVENTION

This invention relates to packet switching architectures and particularly to improvements in architectures for packet routing in networks comprising sort-then-expand packet switching stages.

BACKGROUND OF THE INVENTION

Packet switching arrangements have proven to be preferred switching networks for many types of digital communication. Data packets, each comprising a data portion and a numerical designation of network output port are applied to the input of such a network and the network conveys each packet to the designated output port.

One common packet network is called an expansion network and comprises a plurality of interconnected switch elements having two inputs and two outputs. Switch elements receive packets at both inputs, interpret the output port designations and connect the input packets to the switch element outputs. When two packets enter a switch element destined for the same switch element output, one packet is blocked since only one packet can be sent to a single output at a time. Packet blocking reduces the packet transmission rate of expansion networks and requires facilities for the recovery of the blocked of packets. One expansion network called an Omega network is described in "Access and Alignment of Data in an Array Processor," Transaction Computers, Vol. C-24, No. 12, December, 1975, pp. 1145-1155.

A packet switching network described by Huang and Knauer in "STARLITE: A Wideband Digital Switch," Globecom 1984, pp. 121-124 avoids the blocking problem of expansion networks by sorting incoming packets into ascending (or descending) order based on their destination before they are applied to the inputs of the expansion network. The presorting of packets removes the combinations of input packets which would result in blocking. Since blocking is avoided, the throughput of the network is improved and additional complexities to recover blocked packets are unnecessary. The blocking reduction achieved by the "sort-then-expand" network described by Huang et al. is a great advantage in packet switching. However, difficulties occur in the fabrication of such networks which include large numbers of input and output ports.

To switch groups of packets in a sort-then-expand network the switch elements of both the sort and the expand stages must be fully interconnected so that a packet at any input position within the group can be connected to any output position of the group. Known sort-then-expand networks, such as the Huang et al. network, sort all received packets as a single group and expand the sorted sequence as a single group. Such networks must include full interconnectivity which is achieved by providing multiple layers of switch elements and complex connections between the layers. When the number of packets in the group is the size required for a commercial product, e.g., 128 or more, many layers of switch elements are required resulting in large amounts of switching circuitry with complex interconnections.

The number of circuit packs required to fabricate a design is determined in part by the amount of circuitry on a circuit pack which is limited by power, heat dissipation and surface area available as well as by the number of input and output connections required by the circuitry on the circuit pack. When standard circuit layout techniques are applied to known commercial size sort-then-expand networks, the number of circuit packs required is large because of: (a) the large amount of switching circuitry required (many layers) and (b) the full interconnectivity of the circuitry decreases the amount of circuitry which can be placed on each circuit pack as a result of input/output connection limitations. This large number of circuit packs results in fabricated products which are large, complex and costly.

In view of the foregoing, a need exists in the art for a commercial size packet switch network which provides the advantageous characteristics of a sort-then-expand network without the size, complexity and cost problems of known systems.

SUMMARY OF THE INVENTION

The foregoing problems are solved and a technical advance is achieved in accordance with the principles of the invention in which the size, complexity and cost of prior sort-then-expand networks are reduced by separating received packets into groups based on packet destinations, sorting each group without regard to the other groups and recombining portions of the the sorted groups in a plurality of expansion type output switches before the packets are connected to network output ports. To elaborate, the output ports of the network comprise a plurality of output switches and when packets are received by an input arrangement they are approximately evenly distributed, according to output switch destination, to a plurality of intermediate sort units which identify groups of packets destined for a common output switch and connect the identified groups to the destination output switches. The output switches merge the received groups of packets and distribute the individual packets to the destination output ports.

An illustrative input arrangement for networks comprising intermediate sort units comprises an input sort network for sorting received packets into a sequence based on the output switch designation of the packets. Even distribution of the packets based on output destination is obtained by connecting every nth packet of the sequence of packets from the input sort network to the same intermediate switch unit.

Further advantages are obtained by an input arrangement which comprises a plurality of input sort units for distributing packets to intermediate sort units. Each input sort unit orders a predetermined number of the received packets into a sequence based on the output destinations of the predetermined number of packets. Approximately even distribution of packets to the intermediate sort units is achieved by connecting every nth packet of the sequence of packets from each input sort unit to the same intermediate sort unit. Providing a plurality of input sort units improves the physical realizability of the network by reducing the number of interconnections needed for packet distribution by reducing packet group size.

Intermediate sort units receive the approximately even distribution of packets from the input arrangement and identify groups of packets according to the output switch for which they are destined. In a specific embodiment, the intermediate sort unit sorts packets based on packet destinations into a plurality of groups equal in number to the number of output switches and connects each group to a different one of the output switches.

The physical realizability of the network is further enhanced by providing a predetermined number of connections between the intermediate units and the output switches. When such a predetermined number of connections exists, the intermediate sort units comprise circuitry, as a part of a trap arrangement, which limits the number of packets in a group to the predetermined number before they are connected to the output switches. When each packet includes priority information defining the relative importance of the packet, the circuitry is advantageously responsive to the priority information so that the lowest priority packets are inhibited.

In a specific embodiment of the invention, the packets are sorted by intermediate sort units in accordance with both destination and priority information such that the packets are sorted into groups and the packets are specifically arranged according to priority within each group. Inhibit circuitry separates each group of packets into a first and second subgroup such that the number of packets in the second subgroup is zero as long as the number of packets in the first subgroup is less than or equal to the predetermined number and the priority of packets in the first subgroup is higher that the priority of packets in the second subgroup. The packets in the first subgroups are then connected to the output switch units. Further advantage is obtained when the second subgroups of packets are delayed in a delay circuit and routed to the output switches at a later time. The delay in retransmission of packets is provided in an illustrative embodiment by merging the delayed packets with later received groups of packets which are switched to output ports as described above.

An illustrative output switch unit comprises a network for merging the groups of packets received from the intermediate sort units into a sequence based on the output port designation to facilitate distribution of the packets to the output ports. Due to the distribution of incoming packets, it is possible that an output switch unit will receive more than one packet for a single destination output port. The output switch unit includes an inhibit arrangement for inhibiting all but one packet for a single destination output port. Advantageously, the inhibited packets are delayed for later transmission to the output ports and the particular packets to be inhibited are selected based on packet priority.

DETAILED DESCRIPTION

Figure 1:
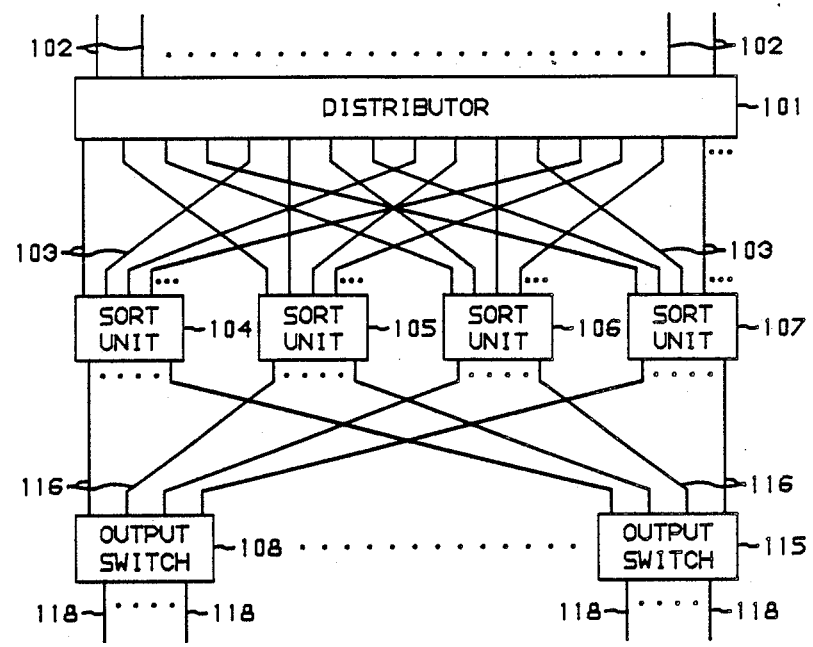
FIG. 1 is a block diagram of packet switching network embodying the invention.

FIG. 1 is a block diagram of a packet switching network embodying the present invention. A distributor 101 receives packets on 128 incoming packet paths 102 and distributes each received packet to one of the four sort units 104 through 107 via distributor output paths 103. Distributor 101 sorts received packets in ascending order from the left based on the particular one of eight output switches 108 through 115 which is the destination output switch for the packet. After the packets have been sorted by distributor 101 they are applied to distributor output paths 103 such that packets destined for the lowest numbered output switch 108 appear at the left most outputs 103 and packets destined for the highest numbered output switch 115 appear at the right end of the sorted sequence of packets. Inactive packets as described later herein, are applied to the right most outputs 103 of distributor 101.

Advantageously, the output paths 103 of distributor 101 are connected to inputs of sort units 104 through 107 in a predetermined pattern which evenly distributes the received packets received by distributor 101 to the sort units and provides each sort unit with a representative sample, based on the output switch destinations of the incoming packets. The predetermined pattern of the present embodiment consists of connecting the left most output 103 and each fourth output thereafter (0, 4, 8 . . . ) to the sort unit 104; the second left most output and each fourth output thereafter (1, 5, 9 . . . ) to sort unit 105; the third left most output 103 and each fourth output thereafter (2, 6, 10 . . . ) to sort unit 106 and the fourth left most output 103 and each fourth output thereafter (3, 7, 11 . . . ) to sort unit 107. The even distribution of packets to each of the switch units 104 through 107 based on output switch destination of the packets gives each sort unit, e.g. 104 approximately the same number of packets (within one) destined for one output switch, e.g., 115 as is given to all of the other switch units 105 through 107.

Each intermediate sort unit 104 through 107 receives 32 packets (128÷4) from distributor 101 and sorts the packets into eight groups based on the particular one of eight output switches 108 through 115 to which each packet is destined. When any group contains more than four packets destined for one output switch, four packets are selected for transmission to the output switch designated by the packets of the group. (The treatment of nonselected packets is discussed later herein in a more detailed description of sort units 104 through 107.) The packets remaining in each group after selection are transmitted via communication paths 116 to the output switch designated by the packets of the group. Each output switch 108 through 115 merges the groups of packets it receives and switches them by an expansion switch to designated output ports 118.

Distributor 101 provides each sort unit 104 through 107 with an approximately representative sample of input traffic and each sort unit separates this representative sample into groups based on the output switch 108 through 115 which is the destination of each packet. Since the packets received by each sort unit 104 through 107 represent the overall incoming traffic, sorting by the sort units can be performed independently by multiple units rather than a single sort unit and the makeup of the groups formed by each individual sort unit still represents the incoming traffic. The merger of the sort unit groups by the output switches 108 through 115 recombines these groups of packets for final connection to output ports. Advantageously, the stages of this architecture are separated into multiple units which do not require interconnection within the stage and thus avoid the complex intrastage connection of the prior art.

Figure 2:
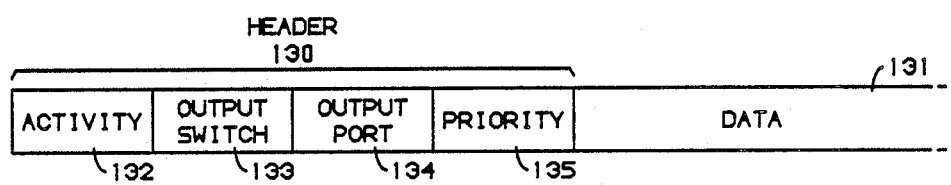
FIG. 2 represents the format for packets used in the embodiment.

The following more detailed description of the operation of the packet switching network begins with a description of a representative packet shown in FIG. 2. The packet of FIG. 2 comprises a header portion 130 and a data portion 131. Header portion 130 comprises an activity bit 132 which is a "0" to identify an active packet and a "1" to identify an inactive packet, a 3-bit output switch designation portion 133, a 4-bit output port designation 134, and a priority designation portion 135. The output switch designation portion 133 defines destination output switch, e.g., 108 for the packet and the output port designation 134 define the particular output port 118 of the designated output switch which is to receive the packet. The priority field 135 is used in a well-known manner to identify the relative need for transmitting the packet including it. A priority field of 135 of "0" denotes highest priority and increasing the numerical significance of the priority field decreases priority.

Figure 3:
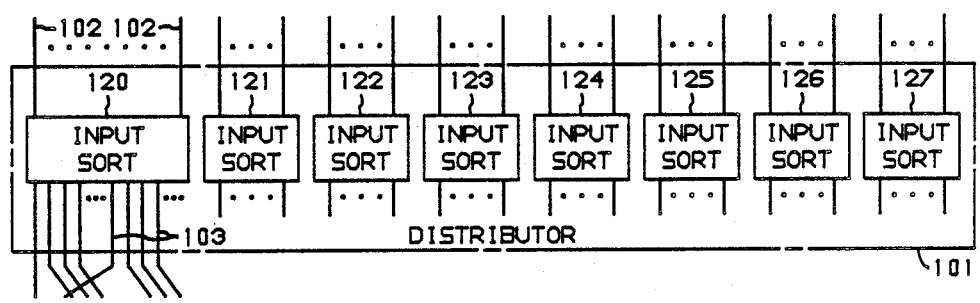
FIG. 3 is a block diagram of a distribution shown in FIG. 1.

FIG. 3 is a representation of an embodiment of distributor 101 which performs distribution using eight input sort units, 120 through 127 rather than the single sort unit of FIG. 1. Although this distribution configuration may lessen the representative nature of the packets provided to sort units 104 through 107, the separation of the distribution function into multiple units provides the advantage of reducing the intrastage interconnections within distributor 101 making fabrication more feasible. Each of the input sort units 120 through 127 receives packets from 16 input communication paths 102, sorts the packets received into ascending order from the left based upon the activity bit 132 (FIG. 2) followed by the output switch designation 133. (Further distribution advantage can be gained, with an increase in input sort unit complexity, by including priority in the sort key so that adjacent packets destined for the same output switch are arranged by decreasing priority). The inclusion of the activity bit 132 in the sort results in all inactive packets being placed together on the right in the output sequence. The sorted sequence of packets from each input sort, e.g., 120 is applied to 16 communication paths 103. The 16 outputs 103 of input sort unit 120 are distributed across the inputs of sort units 104 through 107 to evenly distribute received packets. Specifically, the first four outputs of input sort unit 120 from the left are connected in sequence to sort units 104 through 107 and the next four outputs and each group of four outputs thereafter is connected in sequence to switch units 104 through 107. This pattern of connection exists for input sort units 121, 122 and 123 except that the outputs of input sort unit 121 are connected to sort units 105, 106, 107 and 104 in sequence the outputs sort unit 122 are connected to sort units 106, 107, 104 and 105 in sequence, and the outputs of input sort unit 123 are connected to switch units 107, 104, 105 and 106 in sequence. The pattern of connections between input sort units 124 through 127 and sort units 104 through 107 is the same as the pattern of connections for input sort units 120 through 123, respectively.

Separating the distribution function of distributor 101 to eight input sort units, preserves the intrastage connection advantage of small versus larger packet groups and the connection pattern between input sort units 120 through 127 and sort units 104 through 107 preserves the approximately even distribution of received packets to the sort units. The use of multiple input sort units 120 through 127 does impact the evenness of packet distribution to sort units 104 through 107. With eight input sort units 120 through 127 connected to four sort units 104 through 107 in the described interconnection pattern, it is possible (although unlikely) that the sort unit, e.g., 104 receiving the largest number of packets for a given output switch may receive up to eight more packets for that given output switch unit than the switch unit, e.g., 121 receiving the fewest number of packets for the given output switch. This amount of unevenness of distribution has been found to be adequate for functional switch arrangements.

Figure 4:
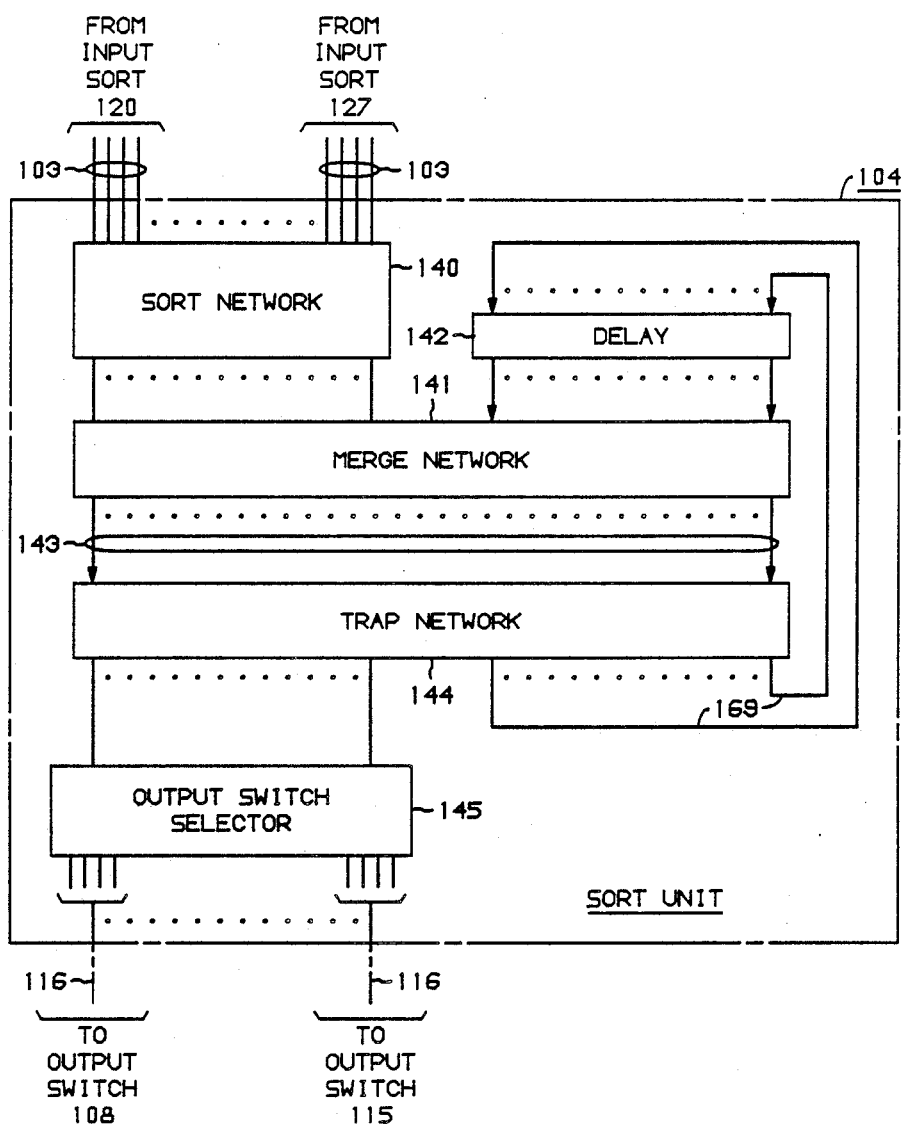
FIG. 4 is a block diagram of a sort unit shown in FIG. 1.

The structure of sort units 104 through 107 is described with reference to FIG. 4 which is a representation of the structure of sort unit 104. Sort unit 104 receives four input packets from each of the eight input sort units 120 through 127 for a total of 32 input packets and transmits four packets to each of eight output switches 108 through 115 for a total of 32 output packets. Sort unit 104 includes a sort network 140 which sorts the 32 received packets into a sequence of packets based on activity bit 132 (FIG. 2) output switch designation 133 and priority field 135.

Sort network 140 can be constructed in the manner described, for example, by Batcher in U.S. Pat. No. 3,428,946 issued Feb. 18, 1969 or as described by Huang et al., in U.S. Pat. No. 4,516,238 issued May 7, 1985. Sort network 140 sorts 32 received packets in accordance with the numerical significance of a "sort key" and produces an output of 32 packets in parallel in which those packets having the least significant sort key appear at one end (left) and those with the most significant sort key (right) at the other. Advantageously, the sort key is chosen to comprise, in sequence, the activity bit 132, the output switch destination 133 and the priority field 135 (FIG. 2) (it will be remembered that a priority field of 0 denotes the highest priority). The use of this sort key produces an output in which active packets are on the left and inactive packets are on the right and the active packets are grouped in accordance with their destination output switch and ordered within each group according to priority (highest priority on the left).

The output packets from sort network 140 are applied to a merge network 141 which merges them with a plurality of packets from a delay unit 142. The packets from delay unit 142 comprise a sorted sequence of earlier received packets which were not transmitted to the outputs of sort unit 104 and their origins are discussed later herein. Merge network 141 is a sort network which although wider is constructed in the same manner as sort network 140 and which uses the same sort key as sort network 140. Accordingly, merge network 141 produces at its outputs 143 a sequence of packets in which active packets destined for the same output switch are grouped together and ordered within each group according to their priority and inactive packs are grouped to the right. The packets at the outputs at 143 of merge network 141 are applied as inputs to a trap network 144.

Trap network 144 receives packets destined for the same output switch on adjacent ones of conductors 143 and passes the four highest priority packets destined for each output switch to an output switch selector 145. Specifically, when four or fewer packets are destined for a given output switch, e.g., 108 all of those packets are transmitted to the output switch selector 145 and when more than four packets are destined for a given output switch, the four of those packets having the highest priorities are sent to the output switch selector. The packets not sent to the output switch selector 145 are available for recirculation back to the inputs of merged network 141 via the delay unit 142.

Trap network 144 selects those packets for transmission to the output switch selector 145, and designates packets over and above the selected number, should they exist, for recirculation. This may be accomplished, by the arrangement shown in FIG. 6. Each output port of merge network 141 (other than the last) is connected to a first input of a comparator 160 with which it is associated and to a second input of a comparator 160 associated with the adjacent output of merge network 141 in the direction of increasing sort key value (to the right). The last output of merge network 141 is connected only to its associated comparator 160. The comparator associated with the first (left-most) output of merge network 141 also has only one input. The other input is fixed at all "1's" to insure a "0" output (of course, a "0" output can be hard wired without the use of a comparator). In accordance with this connectivity approach, for example, the second output of merge network 141, line 161, is connected to the comparator 160 marked B and to comparator 160 marked C. The third output port of merge network 141, line 162, is also connected to comparator 160 marked C as well as the comparator marked D.

The output signal of each comparator 160 is either a "1" or a "0". It is a "1" when the output switch fields 133 of the packets applied to the comparator are the same, and it is "0" otherwise. Comparator 160 can be constructed from Exclusive OR gates and a flip-flop. In response to a set of output switch designations 0, 0, 1, 2, 3, 4, 4, 4, 4, 4, 6, 6, . . .

the comparators yield the output signal set 0, 1, 0, 0, 0, 0, 1, 1, 1, 1, 0, 1 . . .

Figure 6:
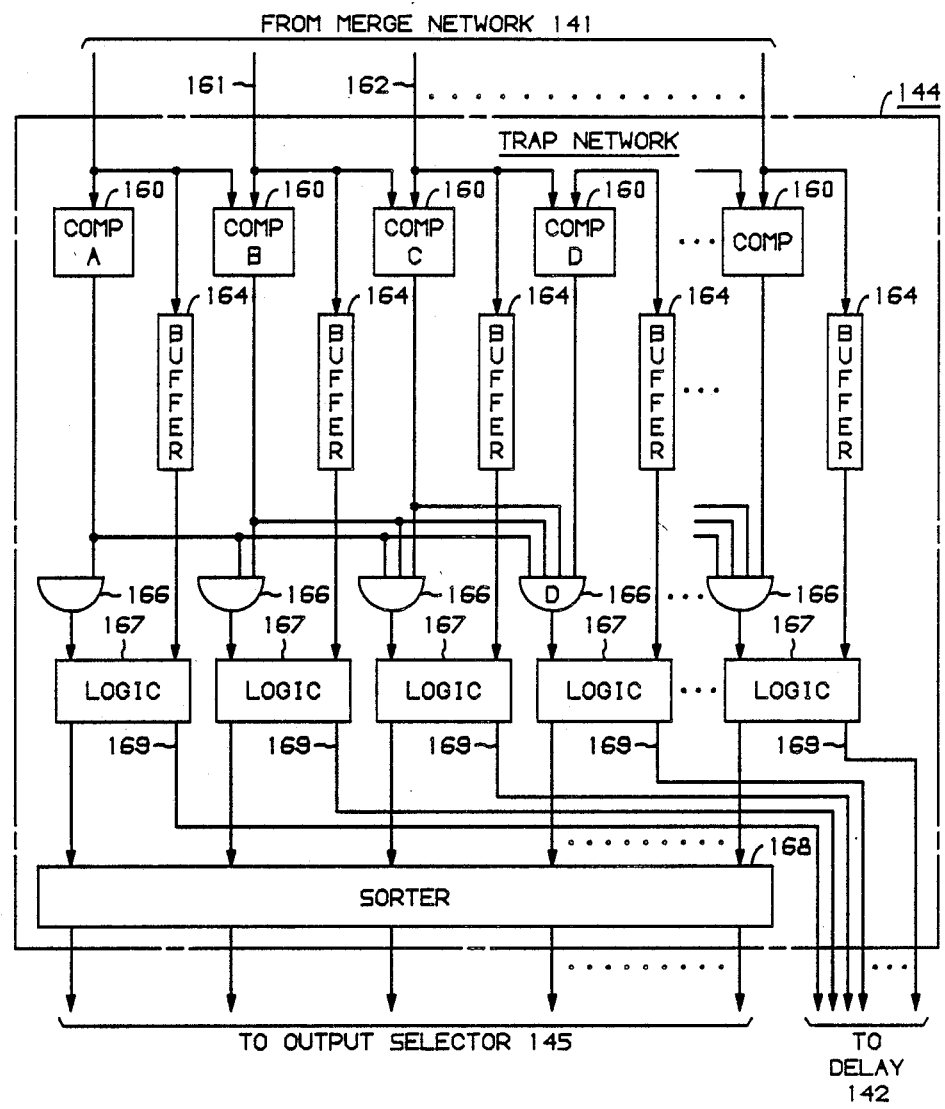
FIG. 6 is a representation of a trap network shown in FIG. 4.

The second layer in the trap network of FIG. 6 is a set of AND gates 166 and buffers 164. Again, there is a buffer 164 associated with each output of merge network 141 as well as an associated AND gate 166. Buffer 164 delays the output of merge network 141 and provides the delayed packet to a logic circuit 167. Each gate 166 is connected to its associated comparator and to a fixed number of previous adjacent comparators. The total number of inputs to each AND gate 166 is equal to the number packets that is permitted to be applied by each sort unit, e.g., 104 simultaneously to an output switch, e.g., 108. In FIG. 4, that number is 4, and accordingly, each AND gate 166 is connected to its associated comparator and to three previous comparators (when they exist). For example, AND gate 166 marked D is connected to outputs of comparators A, B, C and D. The size of the buffer 164 is arranged to coincide with the completion of the comparison performed in comparators 160. At that time, the output of AND gate 166 is a "1" only if the two addresses applied to the relevant comparators are equal. That signal, together with the packet signal at the output of buffer 164, is applied to logic circuit 167.

For the set of signals employed above, the outputs of AND gates 166 form the signal set 0, 0, 0, 0, 0, 0, 0, 0, 0, 1, 0, 0.

The only "1" in the above set is associated with the fifth packet that seeks to be connected to output switch "4". This fifth packet is not selected for transmission to output selector 145 and is made available for recirculation. Logic circuit 167 responds to a "0" from AND gate 166 by gating the packet from buffer 164 to a sorter 168 and responds to a "1" from AND gate 166 by gating the packet to delay 142 via a conductor 169. Logic circuits 167 receive packets in the same order that they leave merge network 141, that is, they are grouped in sequence based on output switch designation and ordered on priority (from left to right) within each group. Accordingly, the left most (highest priority) four packets of each group are sent to sorter 168 while the right most (lower priority) packets of each group, if they exist, are recirculated. Sorter 168 sorts the packets from logic circuits 167 into a sequence based on output switch designation to place consecutive packets on adjacent output paths and transmits them to output selector 145.

The number of packets actually recirculated is a design choice which controls the cost and performance of the sort unit 104. Recirculating few packets, keeps the delay, merge and trap networks small which means that a significant number of packets may be dropped by the trap network 144. Alternatively, recirculating a large number of packets reduces the number of packets dropped but increases the cost and complexity of the delay, merge and trap networks since each of these networks must convey a larger number of packets. Delay unit 142 can be constructed to implement this design choice by selecting packets for recirculation.

Output switch selector 145 responds to output switch designations to connect received packets to its output ports. The outputs of output switch selector 145 are connected to each output stage switch in groups of four. Each group being connected to one output stage switch as shown in FIG. 4. The left-most four outputs of switch selector 145 are connected to the output switch 108 and the right most four outputs of output switch selector 145 are connected to output switch 115. Output switch selector 145 responds to the output switch designation 133 of each received packet and gates the packet to one of the outputs in a group connected to the designated output switch, e.g., 108.

Figure 5:
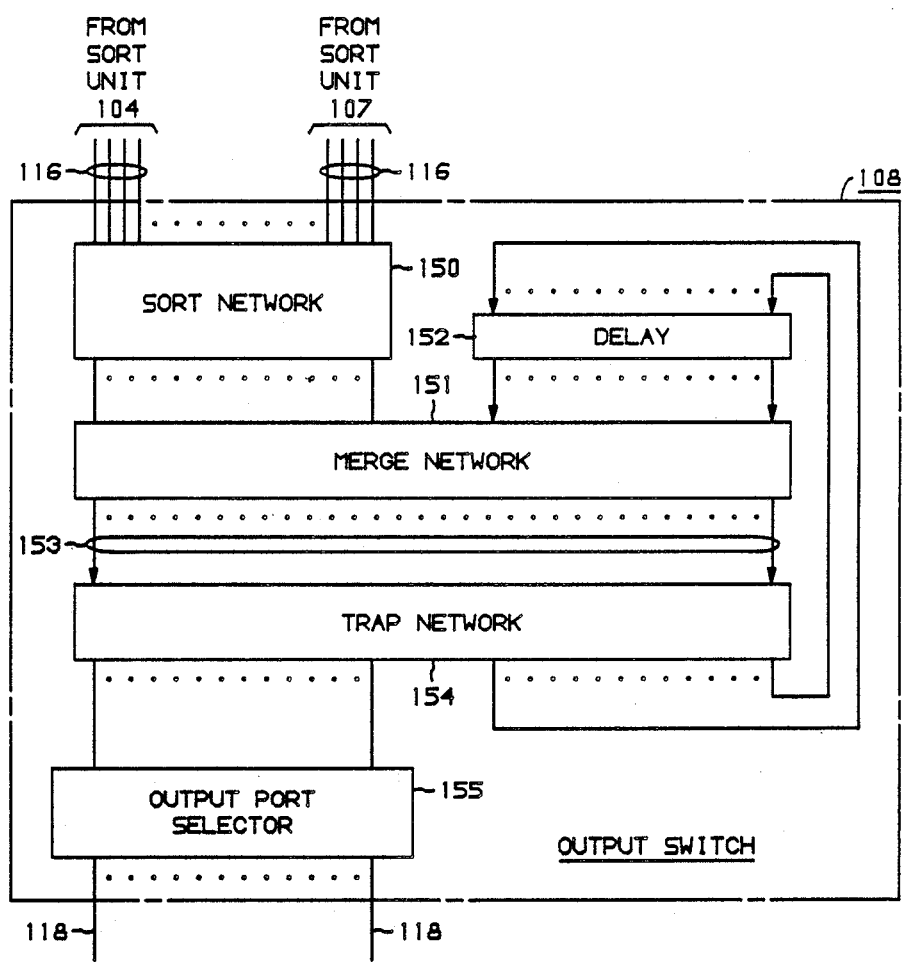
FIG. 5 is a block diagram of an output switch shown in FIG. 1.

The switching network of FIG. 1 includes eight output switches 108 through 115 each of which is substantially identical to the other output switches. FIG. 5 shows the block diagram structure of output switch 108 and represents the structure of all eight output switches 108 through 115.

Output switch 108 includes a sort network 150 which receives four packets from each of the four sort units 104 through 107 by the previously described operation of sort units 104 through 107 and the connection paths 116. The packets sent to output switch 108 all include an output switch designation 133 (FIG. 2) defining output switch 108. Sort network 150 sorts the received packets into an ascending order sequence based on the output port specified in the output port field 134 (FIG. 2) of the packet and packet priority.

The sorted packets are applied to a merge network 151 where they are merged with packets from a delay unit 152. The outputs 153 of the merge network 151 comprise the packets from sort network 150 and delay unit 152 arranged in sequence according to their destination output port with packets for the same destination being arranged by priority. The packets are connected via communication paths 153 to a trap network 154. Trap network 154 selects the highest priority packet destined for each of the 16 output ports of the output switch 108. The selected packets are applied to an output port selector 155 which operates as an expansion network to connect each packet to its destination output port. The packets, which are not transmitted to the output port selector 155, are recirculated to the inputs of delay unit 152 for later merge with the new sequence of packets from sort network 150.

We claim:

1. A packet routing arrangement for routing packets including destination information comprising:
a plurality of output switch means, each output switch means comprising a plurality of output ports, for routing packets received thereby to said output ports;
input means for receiving said packets and responsive to said destination information thereof for distributing said received packets to a plurality of intermediate means such that each intermediate means receives approximately the same number of said packets destined for each output switch means as other intermediate means; and
each of said intermediate means comprises means responsive to said destination information for identifying packet groups with a common output switch means destination and for transmitting said groups of packets to said output switch means.

2. The arrangement of claim 1 wherein said plurality of intermediate means comprises n intermediate means and said input means comprises means for ordering the packets received by said input means into a sequence according to the destinations of received packets defined by said destination information and means for connecting every nth packet of said sequence to the same one of said n intermediate means.

3. The arrangement of claim 1 wherein said plurality of intermediate means comprises n intermediate means and said input means comprises:
a plurality of input sort units each for ordering a predetermined plurality of the packets received by said input means into a sequence according to the destination of received packets defined by said destination information; and
means for connecting every nth packet of each of said sequences of packets to the same one of said n intermediate means.

4. The arrangement of claim 1 wherein each of said intermediate means comprises:
an intermediate sort unit responsive to said destination information for sorting the packets distributed thereto into a plurality of groups of packets equal in number to the number of switch means; and
connection means for connecting a different one of said groups of packets to each of said output switch means.

5. The arrangement of claim 4 wherein each of said connection means connects a predetermined number of packets to each of said output switch means and each of said intermediate sort units comprises means for limiting the number of packets in each of said groups to said predetermined number.

6. The arrangement of claim 5 wherein each of said packets comprises priority information defining the relative importance of the packet and said means for limiting is responsive to said priority information for selecting packets for inclusion in each of said groups.

7. The arrangement of claim 1 wherein each of said packets comprises priority information and each of said intermediate means comprises:
intermediate sort means responsive to said destination information and said priority information for sorting the packets distributed thereto into a plurality of groups of packets equal in number to the number of output switch means and arranged within each group according to priority;
inhibit means for separating each group of said packets into a first subgroup and a second subgroup such that the number of packets in said second subgroup is zero as long as the number of packets in said first subgroup is less than or equal to a predetermined number and the priority of packets in said first subgroup is no lower than the highest priority of packets in said second subgroup; and
means for connecting said first subgroups to said output switch units.

8. The arrangement of claim 7 comprising means for delaying the packets of said second subgroups and for later routing a packet of said second subgroups to one of said output switch units.

9. The arrangement of claim 1 wherein each of said output switch units comprises:
means responsive to said destination information for merging said packet groups into a sequence of packets based upon the output port destinations and
means of routing the packets of said sequence to said output ports.

10. The arrangement of claim 9 wherein said means for routing comprises means for inhibiting the routing of a selected packet to one of said output ports which is a destination of more than one packet in said sequence of packets.

11. The arrangement of claim 10 comprising retransmit means for delaying said selected packet and for later routing said selected packet to one of said output ports.

12. The arrangement of claim 10 wherein each of said packets comprises priority information and said inhibiting means comprising means for inhibiting the routing of a packet having the lower priority of two packets destined for the same output port.

13. A packet routing arrangement for routing packets including destination information comprising:
a plurality of output switch means;
a distribution means for receiving a plurality of said packets, said distribution means comprising a plurality of input sort means each responsive to the destination information of a predetermined number of said plurality of packets for sorting said predetermined number of packets into an input sequence;
connection means for connecting the packets of each of said input sequences of packets to a plurality of intermediate sort means such that each intermediate sort means receives approximately the same number of said packets destined for each of said output switch means as other intermediate switch means;
each of said intermediate sort means comprises means responsive to said destination information for identifying packet groups with a common output switch means destination and means for transmitting each of said packet groups to the one of said output switch means which is the common destination thereof; and
each of said output switch means comprises a plurality of output ports, means responsive to said destination information for merging said packet groups received thereby into an output sequence based on the output port destinations of said packets and means for routing the packets of said output sequence to said output ports.

* * * * *

UNITED STATES PATENT AND TRADEMARK OFFICE
CERTIFICATE OF CORRECTION

PATENT NO: 4,899,335
DATED: February 6, 1990
INVENTOR(s): James M. Johnson, Jr., and Ronald A. Spanke It is certified that errors appear in the above-identified patent and that said Letters Patent is hereby corrected as shown below:

In the claims:

Column 9, line 54, claim 4, "of switch means" should be "of output switch means".

Signed and Sealed this

Twenty-ninth Day of June, 1993

*Attest:*

MICHAEL K. KIRK

*Attesting Officer*   *Acting Commissioner of Patents and Trademarks*